United States Patent [19]
Phillips et al.

[11] Patent Number: 5,815,736
[45] Date of Patent: Sep. 29, 1998

[54] AREA AND TIME EFFICIENT EXTRACTION CIRCUIT

[75] Inventors: Christopher E. Phillips, San Jose; Narendra Sankar, Sunnyvale, both of Calif.

[73] Assignee: National Semiconductor Corporation, Santa Clara, Calif.

[21] Appl. No.: 451,434

[22] Filed: May 26, 1995

[51] Int. Cl.$^6$ .................................................. G06F 7/00
[52] U.S. Cl. .............................................. 395/898; 395/565
[58] Field of Search ................................ 395/375, 898, 395/565

[56] References Cited

U.S. PATENT DOCUMENTS

| | | | |
|---|---|---|---|
| 5,189,319 | 2/1993 | Fung et al. | 326/86 |
| 5,204,953 | 4/1993 | Dixit | 711/220 |
| 5,254,888 | 10/1993 | Lee et al. | 327/298 |
| 5,259,006 | 11/1993 | Price et al. | 375/356 |
| 5,404,473 | 4/1995 | Papworth et al. | 395/588 |
| 5,408,626 | 4/1995 | Dixit | 711/220 |
| 5,438,668 | 8/1995 | Coon et al. | 395/380 |
| 5,524,256 | 6/1996 | Turkowski | 395/898 |
| 5,546,552 | 8/1996 | Coon et al. | 395/385 |
| 5,619,666 | 4/1997 | Coon et al. | 395/384 |

FOREIGN PATENT DOCUMENTS

| | | |
|---|---|---|
| 0368826 | 5/1990 | European Pat. Off. . |
| 0522186 | 1/1993 | European Pat. Off. . |
| 56-162145 | 3/1982 | Japan . |
| 94/27211 | 11/1994 | WIPO . |

OTHER PUBLICATIONS

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L–T Wang et al., "Feedback Shift Register For Self–Testing Circuits", *VLSI Systems Design*, Dec. 1986.

Masakazu Shoji, "CMOS Dynamic Gates", Chapter 5, *AT& T CMOS Digital Circuit Technology*, Prentice Hall, 1988, pp. 210–257.

Guthrie, Charles, "Power–On Sequencing For Liquid Crystal Displays; Why, When and How", *Sharp Application Notes*, Sharp Corporation, 1994, pp. 2–1 thru 2–9.

Bernd Moeschen, "NS32SP160—Feature Commnication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

(List continued on next page.)

*Primary Examiner*—Robert B. Harrell
*Assistant Examiner*—Kenneth R. Coulter
*Attorney, Agent, or Firm*—Limbach & Limbach, LLP

[57] ABSTRACT

The present invention is a data word extraction circuit that receives n data words $DW_x$ (for x equal 0 through n−1), where each of the data words $DW_x$ having m bit positions $BP_y$ (for y=0 through m−1). The circuit provides at least one of the data words $DW_x$ to an extraction circuit output responsive to an extraction indicator signal. Specifically, a group of data selector elements $DSE_y$, each corresponding to a separate one of the bit positions $BP_y$ in the received data words. Each data selector element includes a data output $DO_y$ and a plurality of data inputs $DI_x$. Each data input $DI_x$ is connected to receive a bit from the bit position $BP_y$ to which the data selector element $DSE_y$ corresponds, of a data word $DW_x$ to which the data input $DI_x$ corresponds. A select input is responsive to the extraction indicator signal such that the data selector element $DSE_y$ provides, at the data output, the bit received at one of the data inputs $DI_x$ that corresponds to the extraction indicator signal. The bits provided at the data outputs of the group of data selector elements are collectively provided to the extraction circuit output.

3 Claims, 2 Drawing Sheets

OTHER PUBLICATIONS

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufman Publishers, Inc. 1990.

*PowerPC601 Reference Manual*, IBM, 1994, Chapter 9, "System Interface Operation", pp. 9–15 thru 9–17.

Intel Corp., Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

AREA AND TIME EFFICIENT EXTRACTION CIRCUIT

TECHNICAL FIELD OF THE INVENTION

The present invention relates to field extraction circuits and in particular, to a high-speed field extraction circuit which has a minimum wiring complexity.

BACKGROUND OF THE INVENTION

Processor machine code instructions are typically have pre-defined instruction "fields" which may be predictably located within each instruction. Referring to the processor decoder described in commonly-assigned U.S. patent application Ser. No. 08/445,563, entitled "TAGGED PREFETCH AND INSTRUCTION DECODER FOR VARIABLE LENGTH INSTRUCTION SET AND METHOD OF OPERATION", filed on even date herewith and which is hereby incorporated by reference in its entirety, the decoder extracts particular fields of an instruction to be decoded from an instruction stream.

Well known methods of instruction field extraction involve loading the instruction to be decoded into a register and then shifting the bits of the instruction such that a field of interest is located in a portion of the register (usually the least significant portion of the register) from which the field can be manipulated. However, particularly with the quest for smaller and faster processors, such methods usually require shifting (or transposition) circuitry, which is area and time inefficient. Long wiring distances usually contribute to this area and time inefficiency. For a background on shifting circuitry, the reader is referred to a basic textbook on CMOS design (e.g., C. A. Mead and L. A. Conway, *Introduction to VLSI Systems*, Section 5.7, Addison-Wesley, Reading, Mass., 1980).

What is desired is a circuit for extracting instruction fields which has relatively low wiring complexity and area, and which operates at relatively high speed.

SUMMARY OF THE INVENTION

The present invention is a data word extraction circuit that receives n data words $DW_x$ (for x equal 0 through n−1), where each of the data words $DW_x$ having m bit positions $BP_y$ (for y=0 through m−1). The circuit provides at least one of the data words $DW_x$ to an extraction circuit output responsive to an extraction indicator signal. Specifically, a group of data selector elements $DSE_y$, each corresponding to a separate one of the bit positions $BP_y$ in the received data words. Each data selector element includes a data output $DO_y$ and a plurality of data inputs $DI_x$. Each data input $DI_x$ is connected to receive a bit from the bit position $BP_y$ to which the data selector element $DSE_y$ corresponds, of a data word $DW_x$ to which the data input $DI_x$ corresponds. A select input is responsive to the extraction indicator signal such that the data selector element $DSE_y$ provides, at the data output, the bit received at one of the data inputs $DI_x$ that corresponds to the extraction indicator signal. The bits provided at the data outputs of the group of data selector elements are collectively provided to the extraction circuit output.

In a further embodiment of the invention, a second group of data selector elements $DSE2_y$ is also provided. Each of the data selector elements corresponds to a separate one of the bit positions $BP_y$ in the received data words $DW_x$. Like the first group of data selector elements, each of the second group of data selector elements includes a data output $DO2_y$. Each of the second group of data selector elements further includes a plurality of data inputs $DI2_x$. Each data input $DI2_x$ is connected to receive a bit from the bit position $BP_y$ to which the data selector element $DSE2_y$ corresponds, of a data word $DW_{(x-1)REMn}$ to which the data input $DI_x$ corresponds. Also like the first group of data selector elements, each of the second group of data selectors includes a select input that is responsive to the extraction indicator signal. The data selector element $DSE_y$ provides, at the data output, the bit received at one of the data inputs $DI_x$ that corresponds to the extraction indicator signal. The bits provided at the data outputs of the second group of data selector elements are also collectively provided to the extraction circuit output.

A better understanding of the features and advantages of the invention will be obtained by reference to the following detailed description and accompanying drawings which set forth an illustrative embodiment in which the principles of the invention are utilized.

DETAILED DESCRIPTION

Figure 1A:
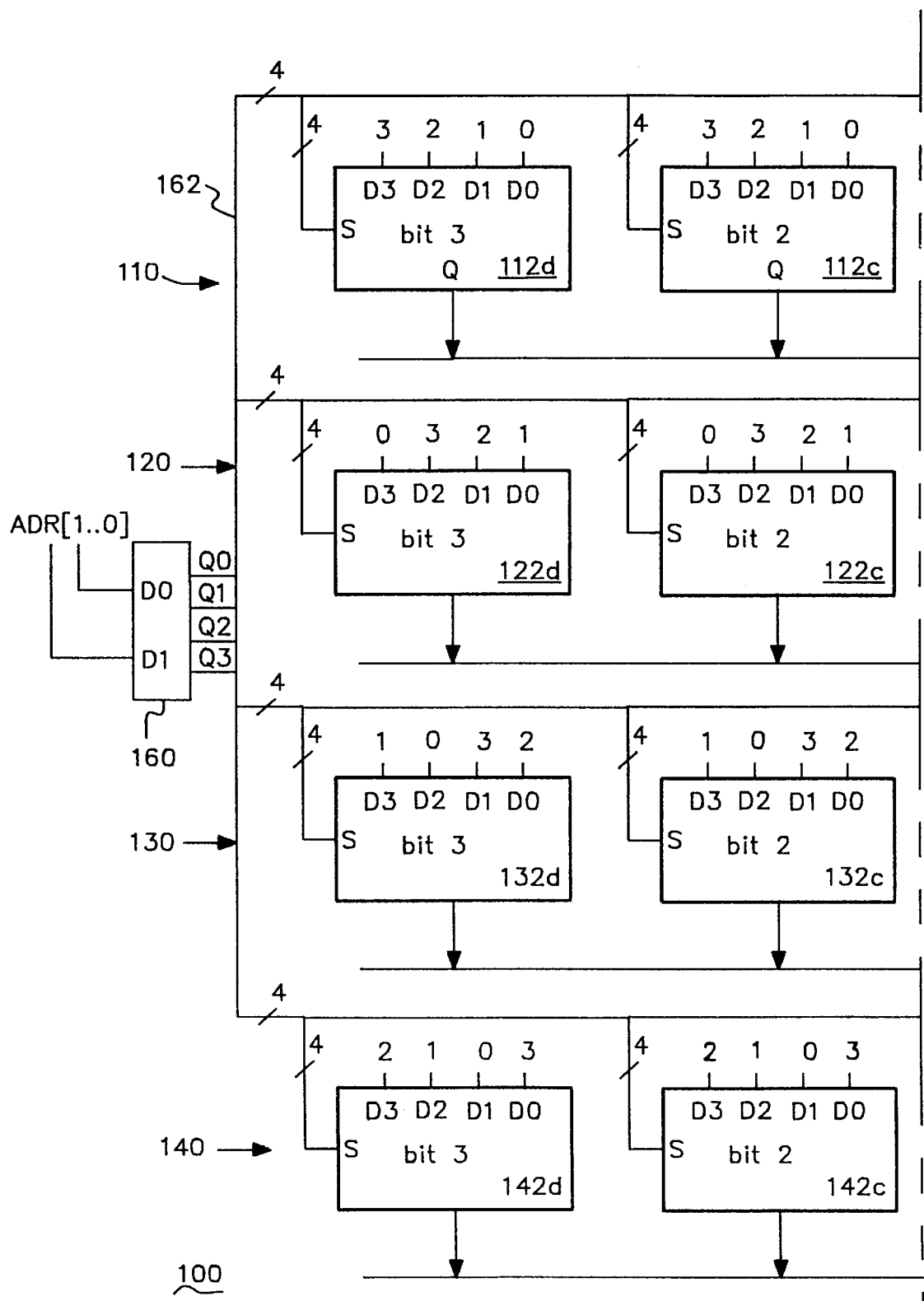
FIGS. 1A and 1B schematically illustrate a field extraction circuit in accordance with the present invention.
Figure 1B:
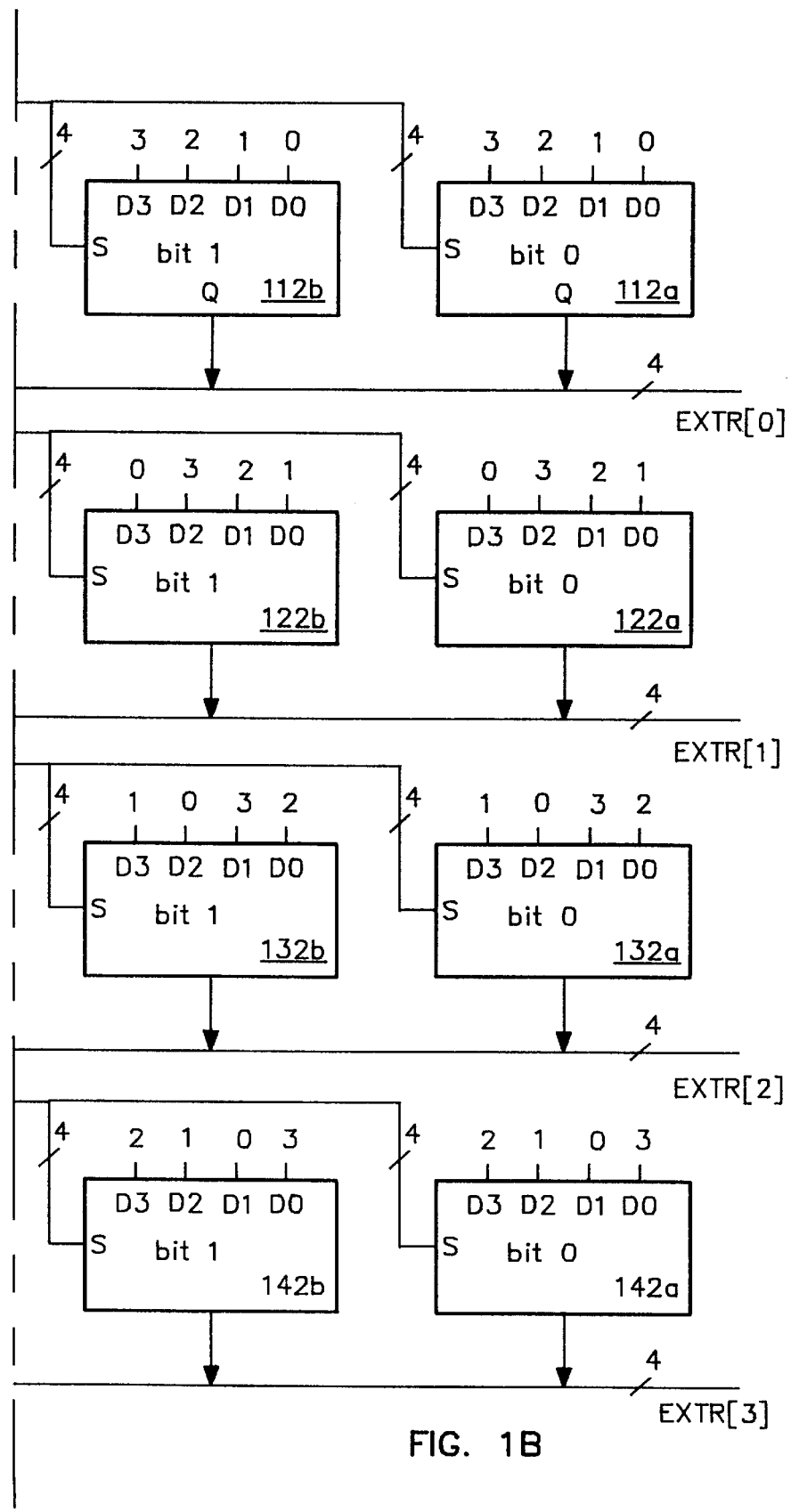

Referring to the field extraction circuit 100 illustrated in FIGS. 1A and 1B, a first row 110 of four-to-one data selectors 112a through 112d are each configured to receive four bits of an instruction. In particular, four-to-one data selector 112a receives, at its four inputs, the least significant bit (i.e., bit 0) of each of four words—words 0 through 3—of an input data stream. The input data stream may be, for example, instructions to be decoded by a processor decoder. The least significant input, D0, of four-to-one data selector 112a receives bit 0 of word 0; the next significant input, D1, receives bit 0 of word 1; the next significant input, D2, receives bit 0 of word 2; and the most significant input, D3, receives bit 0 of word 3.

Four-to-one data selector 112b receives, at its four inputs, the next to least significant bit (i.e., bit 1) of each of words 0 through 4. Similar to four-to-data selector 112a, input D0 receives bit 1 of word 0; input D1 receives bit 1 of word 1; input D2 receives bit 1 of word 2; and input D3 receives bit 1 of word 3. Referring to FIG. 1A, it can be seen that a similar pattern is followed for four-to-one data selectors 112c and 112d.

A second row 120 of four-to-one data selectors 122a through 122d are each configured to receive the same four bits received by the data selectors 112a through 112d, respectively, of the first row 110, but rotated. That is, referring to FIGS. 1A and 1B, it can be seen that the four bits received by each of four-to-one data selectors 122a through 122d of row 120 are rotated by one bit from the four bits received by each of the four-to-one data selectors 112a through 122d, of row 110. For example, the least significant input of four-to-one data selector 122a, D0, receives bit 0 of word 1, as compared to the least significant input of four-to-one data selector 112a receiving bit 0 of word 0.

A third row 130 of four-to-one data selectors 132a through 132d are each configured to receive the same four bits received by the data selectors 112a through 112d, respectively, of the first row 110 and the data selectors 122a through 122d, respectively, of the second row 120. However, the four bits received by each of four-to-one data selectors 132a through 132d of the third row 130 are rotated by one bit from the four bits received by the four-to-one data selectors 122a through 122d, respectively, of the second row 120; and by two bits from the four bits received by the four-to-one data selectors 112a through 112d, respectively, of the first row 110.

Finally, a fourth row 140 of four-to-one data selectors 142a through 142d are each configured to receive the same four bits received by the data selectors 112a through 112d, respectively, of the first row 110, but rotated by three bits; by the data selectors 122a through 122d, respectively, of the second row 120, but rotated by two bits; and by the data selectors 132a through 132d, respectively, of the third row 130, but rotated by one bit.

Referring still to FIGS. 1A and 1B, a two-to-one decoder 160 receives a two bit address, ADR [0 . . . 1]. When the two-to-one decoder 160 receives the two-bit address, ADR [0 . . . 1], at its data inputs, D0 and D1, the decoder 160 operates in a conventional manner to assert one, and only one, of the four decoder outputs, Q0 through Q3. The decoder outputs, Q0 through Q3, are connected to a four bit bus 162. It is an important feature that the four bit bus 162 is connected to the select input, S, of every one of the four-to-one data selectors 112a–112d, 122a–122d, 132a–132d, and 142a–142d.

Furthermore, each of the four-to-one data selectors 112a–112d, 122a–122d, 132a–132d, and 142a–142d behave conventionally, and in an identical manner. That is, if decoder output Q0 is asserted, each four-to-one data selector outputs, to its Q data output, the value provided at its D0 data input. If decoder output Q1 is asserted, each four-to-one data selector outputs, to its Q data output, the value provided at its D1 data input. If decoder output Q2 is asserted, each four-to-one data selector outputs, to its Q data output, the value provided at its D2 data input. Finally, if decoder output Q3 is asserted, each four-to-one data selector outputs, to its Q data output, the value provided at its D3 data input.

Taking, for example, four-to-one selector 112a, if decoder output Q0 is asserted, then four-to-one selector 112a selects bit 0 of input data stream word 0 to be provided to its output, Q. Otherwise, if decoder output Q1 is asserted, then four-to-one selector 112a selects bit 0 of word 1 to be provided to its output, Q. If decoder output Q2 is asserted, then four-to-one selector 112a selects bit 0 of word 2 to be provided to its output, Q. Finally, if decoder output Q3 is asserted, then four-to-one selector 112a selects bit 0 of word 3 to be provided to its output, Q. The Q data outputs of the four-to-one data selectors of a particular one of the four rows 110, 120, 130, and 140 collectively provide one of four extracted output values EXTR[0], EXTR[1], EXTR[2], and EXTR[3], respectively.

Thus, the value of the address, ADR [0 . . . 1], determines which word of the input data stream will be provided to the extracted outputs, EXTR [0] through EXTR [3]. That is, first, if ADR[0 . . . 1] is 0, then word 0 is provided to EXTR [0], word 1 is provided to EXTR [1], word 2 is provided to EXTR [2], and word 3 is provided to EXTR [3]. Second, if ADR [0 . . . 1] is 1, then word 1 is provided to EXTR [0], word 2 is provided to EXTR [1], word 3 is provided to EXTR [2], and word 0 is provided to EXTR [3]. Third, if ADR[0 . . . 1] is 2, then word 2 is provided to EXTR [0], word 3 is provided to EXTR [1], word 0 is provided to EXTR [2], and word 1 is provided to EXTR [3]. Finally, if ADR [0 . . . 1] is 3, then word 3 is provided to EXTR [0], word 0 is provided to EXTR [1], word 1 is provided to EXTR [2], and word 2 is provided to EXTR [3].

A particular embodiment in accordance with the invention having been described, it should be understood that various alternatives to the embodiment of the invention described herein may be employed in practicing the invention. For example, the size of the input data stream words may vary from four, as may the number of input data stream words.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA"; U.S. patent application Ser. No. 08/451,965, entitled "SERIAL INTERFACE CAPABLE OF OPERATING IN TWO DIFFERENT SERIAL DATA TRANSFER MODES"; U.S. patent application Ser. No. 08/453,076, entitled "HIGH PERFORMANCE MULTIFUNCTION DIRECT MEMORY ACCESS (DMA) CONTROLLER"; U.S. patent application Ser. No. 08/452,001, entitled "OPEN DRAIN MULTI-SOURCE CLOCK GENERATOR HAVING MINIMUM PULSE WIDTH"; U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION"; U.S. patent application Ser. No. 08/451,924, entitled "EXECUTION UNIT ARCHITECTURE TO SUPPORT x86 INSTRUCTION SET AND x86 SEGMENTED ADDRESSING"; U.S. patent application Ser. No. 08/451,444, entitled "BARREL SHIFTER"; U.S. patent application Ser. No. 08/451,204, entitled "BIT SEARCHING THROUGH 8, 16, OR 32-BIT OPERANDS USING A 32-BIT DATA PATH"; U.S. patent application Ser. No. 08/451,195, entitled "DOUBLE PRECISION (64-BIT) SHIFT OPERATIONS USING A 32-BIT DATA PATH"; U.S. patent application Ser. No. 08/451,571, entitled "METHOD FOR PERFORMING SIGNED DIVISION"; U.S. patent application Ser. No. 08/452,162, entitled "METHOD FOR PERFORMING ROTATE THROUGH CARRY USING A 32-BIT BARREL SHIFTER AND COUNTER"; U.S. patent application Ser. No. 08/451,434, entitled "AREA AND TIME EFFICIENT FIELD EXTRACTION CIRCUIT"; U.S. patent application Ser. No. 08/451,535, entitled "NON-ARITHMETICAL CIRCULAR BUFFER CELL AVAILABILITY STATUS INDICATOR CIRCUIT"; U.S. patent application Ser. No. 08/445,563, entitled "TAGGED PREFETCH AND INSTRUCTION DECODER FOR VARIABLE LENGTH INSTRUCTION SET AND METHOD OF OPERATION"; U.S. patent application Ser. No. 08/450,153, entitled "PARTITIONED DECODER CIRCUIT FOR LOW POWER OPERATION"; U.S. patent application Ser. No. 08/451,495, entitled "CIRCUIT FOR DESIGNATING INSTRUCTION POINTERS FOR USE BY A PROCESSOR DECODER"; U.S. patent application Ser. No. 08/451,219, entitled "CIRCUIT FOR GENERATING A DEMAND-BASED GATED CLOCK"; U.S. patent application Ser. No. 08/451,214, entitled "INCREMENTOR/DECREMENTOR"; U.S. patent application Ser. No. 08/451,150, entitled "A PIPELINED MICROPROCESSOR THAT PIPELINES MEMORY REQUESTS TO AN EXTERNAL MEMORY"; U.S. patent application Ser. No. 08/451,198, entitled "CODE BREAKPOINT DECODER"; U.S. patent application Ser. No. 08/445,569, entitled "TWO TIER PREFETCH BUFFER STRUCTURE AND METHOD WITH BYPASS"; U.S. patent application Ser. No. 08/445,564, entitled "INSTRUCTION LIMIT CHECK FOR MICROPROCESSOR"; U.S.

patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE"; U.S. patent application Ser. No. 08/452,080, entitled "APPARATUS AND METHOD FOR EFFICIENT COMPUTATION OF A 486™ MICROPROCESSOR COMPATIBLE POP INSTRUCTION"; U.S. patent application Ser. No. 08/450,154, entitled "APPARATUS AND METHOD FOR EFFICIENTLY DETERMINING ADDRESSES FOR MISALIGNED DATA STORED IN MEMORY"; U.S. patent application Ser. No. 08/451,742, entitled "METHOD OF IMPLEMENTING FAST 486™ MICROPROCESSOR COMPATIBLE STRING OPERATION"; U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, entitled "DRAM CONTROLLER THAT REDUCES THE TIME REQUIRED TO PROCESS MEMORY REQUESTS"; U.S. patent application Ser. No. 08/451,420, entitled "INTEGRATED PRIMARY BUS AND SECONDARY BUS CONTROLLER WITH REDUCED PIN COUNT"; U.S. patent application Ser. No. 08/452,365, entitled "SUPPLY AND INTERFACE CONFIGURABLE INPUT/OUTPUT BUFFER"; U.S. patent application Ser. No. 08/451,744, entitled "CLOCK GENERATION CIRCUIT FOR A DISPLAY CONTROLLER HAVING A FINE TUNEABLE FRAME RATE"; U.S. patent application Ser. No. 08/451,206, entitled "CONFIGURABLE POWER MANAGEMENT SCHEME"; U.S. patent application Ser. No. 08/452,350, entitled "BIDIRECTIONAL PARALLEL SIGNAL INTERFACE"; U.S. patent application Ser. No. 08/452,094, entitled "LIQUID CRYSTAL DISPLAY (LCD) PROTECTION CIRCUIT"; U.S. patent application Ser. No. 08/450,156, entitled "DISPLAY CONTROLLER CAPABLE OF ACCESSING GRAPHICS DATA FROM A SHARED SYSTEM MEMORY"; U.S. patent application Ser. No. 08/450,726, entitled "INTEGRATED CIRCUIT WITH TEST SIGNAL BUSES AND TEST CONTROL CIRCUITS"; U.S. patent application Ser. No. 08/445,568, entitled "DECODE BLOCK TEST METHOD AND APPARATUS".

It is intended that the following claims define the scope of the invention and that methods and apparatus within the scope of these claims and their equivalents be covered thereby.

What is claimed is:

1. A data word extraction circuit that receives a plurality (n) of data words $DW_x$ (for x equal 0 through n−1), each of said data words $DW_x$ having a plurality (m) of bit positions $BP_y$ (for y=0 through m−1), and that provides one of said data words $DW_x$ to an extraction circuit output responsive to an extraction indicator signal, said data element extraction circuit comprising:

a group of data selector elements $DSE_y$, each of said data selector elements corresponding to a separate one of the bit positions $BP_y$ in the received data words and including a data output $DO_y$;

a plurality of data inputs $DI_x$, each data input $DI_x$ connected to receive a bit from the bit position $BP_y$ to which the data selector element $DSE_y$ corresponds, of a data word $DW_x$ to which the data input $DI_x$ corresponds; and a select input responsive to the extraction indicator signal such that the data selector element $DSE_y$ provides, at the data output, the bit received at one of the data inputs $DI_x$ that corresponds to the extraction indicator signal, the bits provided at the data outputs of the group of data selector elements being collectively provided to the extraction circuit output.

2. A data word extraction circuit as in claim 1, wherein the group of data selector elements $DSE_y$ is a first group of data selector elements $DSE1_y$, and further comprising:

a second group of data selector elements $DSE2_y$, each of said data selector elements corresponding to a separate one of the bit positions $BP_y$ in the received data words $DW_x$ and including a data output $DO2_y$;

a plurality of data inputs $DI2_x$, each data input $DI2_x$ connected to receive a bit from the bit position $BP_y$ to which the data selector element $DSE2_y$ corresponds, of a data word $DW_{(x+1)REMn}$ to which the data input $DI_x$ corresponds; and a select input responsive to the extraction indicator signal such that the data selector element $DSE_y$ provides, at the data output, the bit received at one of the data inputs $DI_x$ that corresponds to the extraction indicator signal, the bits provided at the data outputs of the second group of data selector elements also being collectively provided to the extraction circuit output.

3. A data word extraction circuit as in claim 1, wherein the group of data selector elements $DSE_y$ is a first group of data selector elements $DSE1_y$, and further comprising:

a second group of data selector elements $DSE2_y$, each of said data selector elements corresponding to a separate one of the bit positions $BP_y$ in the received data words $DW_x$ and including a data output $DO2_y$;

a plurality of data inputs $DI2_x$, each data input $DI2_x$ connected to receive a bit from the bit position $BP_y$ to which the data selector element $DSE2_y$ corresponds, of a data word $DW_{(x+j)REMn}$ to which the data input $DI_x$ corresponds, where j is an integer between 1 and n−1, inclusive; and a select input responsive to the extraction indicator signal such that the data selector element $DSE_y$ provides, at the data output, the bit received at one of the data inputs $DI_x$ that corresponds to the extraction indicator signal, the bits provided at the data outputs of the second group of data selector elements also being collectively provided to the extraction circuit output.

* * * * *